(12) United States Patent
Fujiki (10) Patent No.: US 8,179,433 B2
(45) Date of Patent: May 15, 2012

(54) MICROSCOPIC IMAGING APPARATUS AND MICROSCOPIC IMAGING METHOD

(75) Inventor: Hiroshi Fujiki, Tokyo (JP)

(73) Assignee: Olympus Corporation, Tokyo (JP)

( * ) Notice: Subject to any disclaimer, the term of this patent is extended or adjusted under 35 U.S.C. 154(b) by 772 days.

(21) Appl. No.: 12/332,534

(22) Filed: Dec. 11, 2008

(65) Prior Publication Data

US 2010/0149325 A1 Jun. 17, 2010

(51) Int. Cl.
*H04N 5/04* (2006.01)
*H04N 5/335* (2011.01)

(52) U.S. Cl. ....... 348/79; 348/308; 348/222.1; 348/128; 348/138; 348/345; 348/572; 348/141; 347/253; 347/252; 359/368; 359/363; 359/384; 359/385; 359/387; 359/389; 359/386

(58) Field of Classification Search .................... 348/79, 348/558, 555, 524, 525, 464, 467
See application file for complete search history.

(56) References Cited

U.S. PATENT DOCUMENTS

| 7,821,576 B2 * | 10/2010 | Miyabe .................. 348/558 |
| 2005/0110895 A1 | 5/2005 | Masuyama |
| 2007/0058054 A1 | 3/2007 | Kagayama et al. |

FOREIGN PATENT DOCUMENTS

| EP | 1 533 997 A1 | 5/2005 |
| EP | 1 764 640 A2 | 3/2007 |
| JP | 2003-087630 A | 3/2003 |
| JP | 2005-175774 A | 6/2005 |

OTHER PUBLICATIONS

Extended European Search Report dated May 4, 2009 (5 pages), issued in counterpart European Application Serial No. 08021656.7.

* cited by examiner

*Primary Examiner* — Jude Jean Gilles
(74) *Attorney, Agent, or Firm* — Holtz, Holtz, Goodman & Chick, PC (57) ABSTRACT

The microscopic imaging apparatus includes a system controlling unit for obtaining a VD time setting value, and for obtaining the number of electric charge subtracting pulses, a synchronization signal generating unit for generating a vertical synchronization signal on the basis of the VD time setting value output from the system controlling unit and the horizontal synchronization signal, and a timing generating unit for extracting the electric charge of the imaging device by supplying the horizontal synchronization signal by the number of electric charge subtracting pulses to the imaging device as the electric charge subtracting pulses, and for generating a read pulse synchronous with the vertical synchronization signal in order to stop the accumulation of the electric charge of the imaging device after exposure is started.

8 Claims, 8 Drawing Sheets

MICROSCOPIC IMAGING APPARATUS AND MICROSCOPIC IMAGING METHOD

BACKGROUND OF THE INVENTION

1. Field of the Invention

The present invention relates to a technique of a microscopic imaging apparatus that can make time lapse capturing of a sample to be observed at arbitrary capturing intervals.

2. Description of the Related Art

Conventionally, there is a method called time lapse capturing for observing a sequential change in a sample such as a live cell, etc. in a microscopic imaging apparatus. To observe a sequential change in a sample with time lapse capturing, an image of the sample must be repeatedly obtained at arbitrary capturing intervals instructed by an operator.

For example, a digital imaging apparatus that obtains an image by exposing an imaging device such as a CCD (Charge Coupled Device), etc. to light can obtain an image at a capturing interval depending on the number of pixels read from the imaging device. Additionally, an arbitrary capturing interval can be set by repeating still image shooting with a timing signal that is generated by external software or hardware if the capturing interval is sufficiently long with respect to the length of time required to shoot a still image.

Patent Document 1 proposes the technique for shooting an image at short capturing intervals only in an important section. With this technique, a capturing interval is set to a short interval by detecting an external trigger, and captured frames are stored in an internal memory. Moreover, an external frame output is delayed to output frames at normal capturing intervals, and a sequential change in an observation target in an important section is finely checked.

Additionally, Patent Document 2 proposes the technique for implementing an arbitrary capturing interval. With this technique, an arbitrary capturing interval is implemented by changing the frequency of a clock supplied to an imaging device and its peripheral imaging device driving circuit.

[Patent Document 1] Japanese Patent Publication No. 2003-087630

[Patent Document 2] Japanese Patent Publication No. 2005-175774

SUMMARY OF THE INVENTION

A microscopic imaging apparatus in one aspect of the present invention is a microscopic imaging apparatus that can make time lapse capturing for repeatedly obtaining a digital image at desired capturing intervals, and includes a system controlling unit for obtaining a VD time setting value by calculating the number of cycles of a horizontal synchronization signal within a capturing interval and for obtaining the number of electric charge subtracting pulses by calculating the number of cycles of the horizontal synchronization signal in a duration from a shooting start until exposure start timing in order to set an exposure time within the capturing interval, a synchronization signal generating unit for generating a vertical synchronization signal on the basis of the VD time setting value output from the system controlling unit and the horizontal synchronization signal, and a timing generating unit for extracting the electric charge of the imaging device by supplying the horizontal synchronization signal by the number of electric charge subtracting pulses to the imaging device as the charge extracting pulses and for generating a read pulse synchronous with the vertical synchronization signal in order to stop the accumulation of the electric charge of the imaging device after exposure is started.

Preferably, the system controlling unit may obtain an imaging interval divided value by calculating the number of cycles of the vertical synchronization signal from an imaging start until the exposure time in the imaging interval, may set the VD time setting value and the number of electric charge subtracting pulses so that the synchronization signal generating unit and the timing generating unit supply the electric charge subtracting pulses to the imaging device until the number of cycles of the vertical synchronization signal becomes equal to the imaging interval divided value by detecting the number of cycles of the vertical synchronization signal after imaging is started, and may set the VD time setting value and the number of electric charge subtracting pulses so that the synchronization signal generating unit and the timing generating unit supply the electric charge subtracting pulses to the imaging device until the exposure start timing after the number of cycles of the vertical synchronization signal becomes equal to the capturing interval divided value by detecting the number of cycles of the vertical synchronization signal after the imaging is started.

Preferably, the system controlling unit may have a still image shooting mode for setting a cycle of the vertical synchronization signal to a cycle determined in accordance with the number of pixels read from the imaging device and for shooting an image upon detection of a still image shooting instruction signal issued from a still image shooting instructing unit in synchronization with the capturing interval, and a self-running mode for setting the cycle of the vertical synchronization signal to the capturing interval and for repeating shooting in accordance with the cycle of the vertical synchronization signal, and may switch between the still image shooting mode and the self-running mode in accordance with the capturing interval.

Preferably, in the still image shooting mode, the VD time setting value and the number of electric charge subtracting pulses may be set so that the synchronization signal generating unit and the timing generating unit supply the electric charge subtracting pulses to the imaging device until the exposure start timing upon detection of the still image shooting instruction signal, and the VD time setting value and the number of electric charge subtracting pulses may be set so that the synchronization signal generating unit and the timing generating unit supply the electric charge subtracting pulses to the imaging device from exposure completion until shooting completion timing in the capturing interval.

A microscopic imaging method in another aspect of the present invention is a microscopic imaging method that can make time lapse capturing for repeatedly obtaining a digital image at desired capturing intervals, and includes a VD time calculating step of obtaining a VD time setting value by calculating the number of cycles of a horizontal synchronization signal within a capturing interval, an exposure time calculating step of obtaining the number of electric charge subtracting pulses by calculating the number of cycles of the horizontal synchronization signal in a duration from a shooting start until exposure start timing in order to set an exposure time within the capturing interval, and a timing controlling step of generating a vertical synchronization signal on the basis of the VD time setting value and the horizontal synchronization signal, of extracting the electric charge of the imaging device by supplying the horizontal synchronization signal by the number of electric charge subtracting pulses to the imaging device as the electric charge subtracting pulses, and of generating a read pulse synchronous with the vertical synchronization signal in order to stop the accumulation of the electric charge of the imaging device after exposure is started.

Preferably, the timing controlling step may include obtaining an imaging interval divided value by calculating the number of cycles of the vertical synchronization signal from an imaging start until an exposure time in the imaging interval, setting the VD time setting value and the number of electric charge subtracting pulses so that the electric charge subtracting pulses are supplied to the imaging device until the number of cycles of the vertical synchronization signal becomes equal to the imaging interval divided value by detecting the number of cycles of the vertical synchronization signal after imaging is started, and setting the VD time setting value and the electric charge subtracting pulses so that the electric charge subtracting pulses are supplied to the imaging device until the exposure start timing after the number of cycles of the vertical synchronization signal becomes equal to the capturing interval divided value by detecting the number of cycles of the vertical synchronization signal after imaging is started.

Preferably, the timing controlling step may have a still image shooting mode for setting a cycle of the vertical synchronization signal to a cycle determined in accordance with the number of pixels read from the imaging device and for shooting an image upon detection of a still image shooting instruction signal issued from a still image shooting instructing unit in synchronization with the capturing interval, and a self-running mode for setting the cycle of the vertical synchronization signal to the capturing interval and for repeating shooting in accordance with the cycle of the vertical synchronization signal, and may switch between the still image shooting mode and the self-running mode in accordance with the capturing interval.

Preferably, in the still image shooting mode, the VD time setting value and the number of electric charge subtracting pulses may be set so that the electric charge subtracting pulses are supplied to the imaging device until the exposure start timing upon detection of the still image shooting instruction signal, and the VD time setting value and the number of electric charge subtracting pulses may be set so that the electric charge subtracting pulses are supplied to the imaging device from exposure completion until shooting completion timing in the capturing interval.

DESCRIPTION OF THE PREFERRED EMBODIMENTS

Embodiments according to the present invention are described below with reference to the drawings.

First Embodiment

A microscopic imaging apparatus that can make time lapse capturing for repeatedly obtaining a digital image at desired capturing intervals is described.

Figure 1:
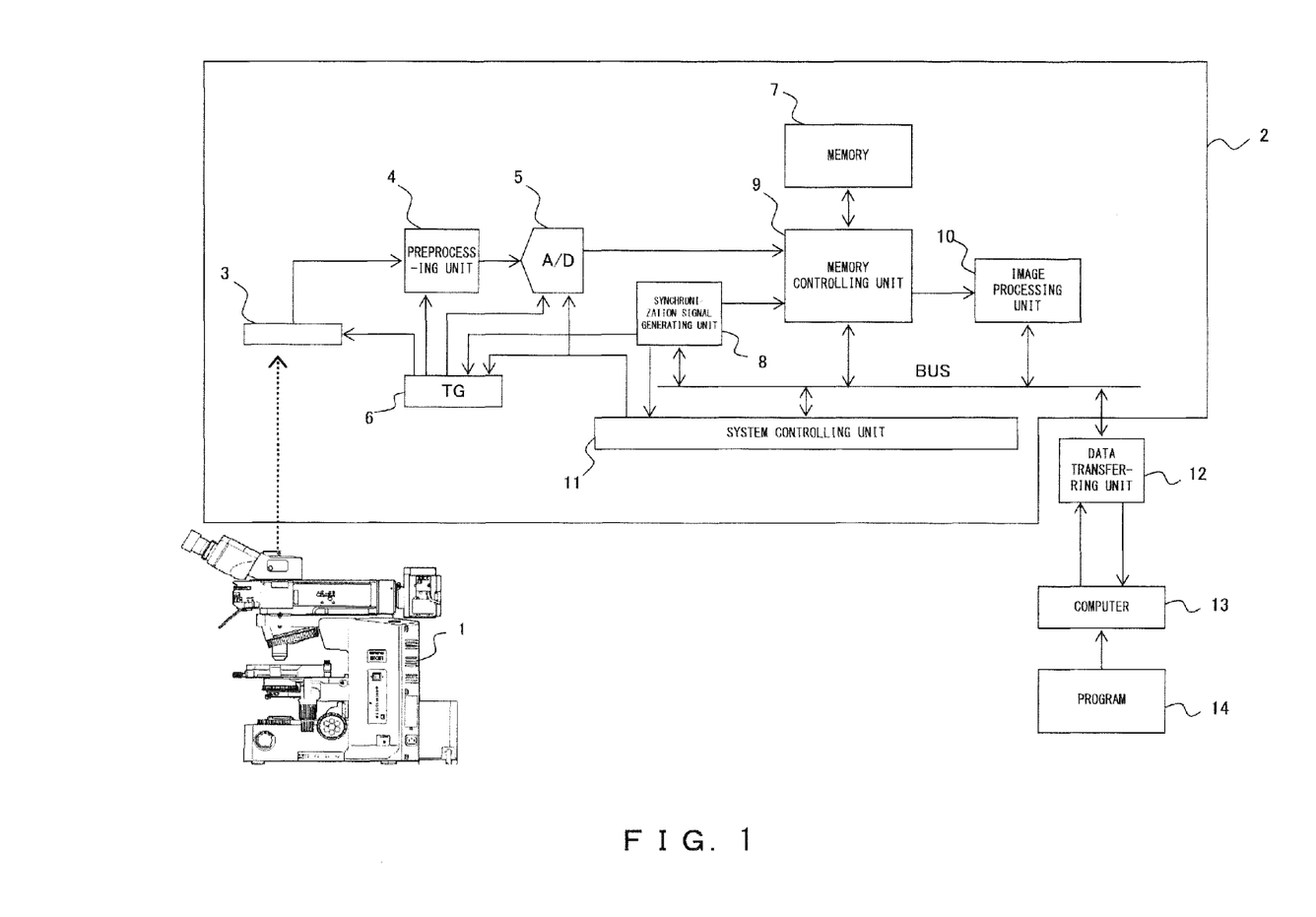
FIG. 1 is a block diagram showing a configuration of a microscopic imaging apparatus according to the present invention.

FIG. 1 is a block diagram showing the configuration of the first embodiment.

A microscope 1 shown in FIG. 1 is arranged, for example, in such a way that an electrically operated stage movable in a third-dimensional direction and an objective lens are arranged as opposed as a viewfield selecting unit and a focus adjusting unit respectively. A sample to be examined is held on the electrically operated stage. An observation image of the sample can be observed by the naked eyes with an eyepiece lens via the objective lens, and can be captured with the microscopic imaging apparatus 2 having an imaging device (CCD, and so on).

The microscopic imaging apparatus 2 according to the present invention is composed of the imaging device 3, a preprocessing unit 4, an A/D converter 5, a timing generating unit 6 (hereinafter referred to as TG), a memory 7, a synchronization signal generating unit 8, a memory controlling unit 9, an image processing unit 10, a system controlling unit 11, and the like. The microscopic imaging apparatus 2 is connected to a PC (personal computer), etc., which is composed of a data transferring unit 12, a computer 13 (running in accordance with a program 14), via a bus.

An observation image of the sample (to be examined) not shown of the microscope 1 is projected onto the imaging device 3 via an optical path (broken line arrow shown in FIG. 1), and output as an electric signal from the imaging device 3. The imaging device 3 is, for example, a solid-state imaging device of a vertical overflow drain structure.

The preprocessing unit 4 converts the signal output from the imaging device 3 into an analog image signal.

The A/D converter 5 converts the analog image signal output from the preprocessing unit 4 into a digital image signal.

The timing generating unit 6 is a pulse generator for driving the imaging device 3, the preprocessing unit 4, and the A/D converter 5. Moreover, the TG 6 exposes the imaging device 3 to light in synchronization with a horizontal synchronization signal HLD generated by the synchronization signal generating unit 8.

Additionally, the TG 6 extracts the electric charge of the imaging device by supplying the horizontal synchronization signal by the number of electric charge subtracting pulses to the imaging device 3 as the electric charge subtracting pulses, and generates a read pulse synchronous with a vertical synchronization signal in order to stop the accumulation of the electric charge of the imaging device after exposure is started.

Specifically, the TG 6 controls an exposure time by outputting the electric charge subtracting pulses (hereinafter referred to as SUB pulses) supplied to the imaging device until exposure start timing in a cycle of the vertical synchronization signal VD.

Furthermore, the TG 6 switches a driving pulse to be output to the imaging device 3 in accordance with the number of pixels (all pixel mode, 2-binning mode, 4-binning mode, and a partial read for reading a particular region) read from the imaging device 3. Moreover, the TG 6 supplies a conversion clock to the A/D converter 5.

The synchronization signal generating unit 8 outputs the horizontal synchronization signal HD and the vertical synchronization signal VD to the TG 6, the memory controlling unit 9, and the system controlling unit 11. The synchronization signal generating unit 8 generates the vertical synchronization signal VD on the basis of the VD time setting value output from the system controlling unit 11 and the horizontal synchronization signal.

A cycle of the vertical synchronization signal VD differs depending on the number of pixels read from the imaging device 3. For example, any of 67 (msec) of the all pixel mode, 34 (msec) of the 2-binning mode, 19 (msec) of the 4-binning mode, and a cycle determined by a read region of a partial read is determined as the cycle above described cycle.

The memory controlling unit 9 writes the digital image signal output from the A/D converter 5 to the memory 7 in synchronization with the horizontal synchronization signal HD and the vertical synchronization signal VD, which are output from the synchronization signal generating unit 8.

Upon completion of reading the image signal, it is read out via the data transferring unit 12 in accordance with the program 14 that is running on the computer 13.

At this time, the image processing unit 10 generates an image signal for which image processes such as a noise reduction and a tone correction are executed, and transfers the generated signal to the computer 13 via the data transferring unit 12.

The system controlling unit 11 is configured by including a CPU and a memory, and controls the A/D converter 5, the FIG. 6, and the memory controlling unit 9 in synchronization with the vertical synchronization signal VD.

Additionally, the system controlling unit 11 obtains the VD time setting value by calculating the number of cycles of the horizontal synchronization signal within a capturing interval. The system controlling unit 11 also obtains the number of electric charge subtracting pulses by calculating the number of cycles of the horizontal synchronization signal from a shooting start until exposure start timing in order to set an exposure time within the capturing interval. Namely, the exposure time of the imaging device 3 is set by setting in the TG6 the number of cycles (the number of SUB pulses) of the horizontal synchronization signal HD, which is equivalent to the duration obtained by subtracting the exposure time from the cycle of the vertical synchronization signal VD. Moreover, the system controlling unit 11 sets the cycle of the vertical synchronization signal VD by setting the number of cycles of the horizontal synchronization signal LID, which is equivalent to the cycle of the vertical synchronization signal VD, in the synchronization signal generating unit 8. The mode set by the system controlling unit 11 is reflected on the next cycle of the vertical synchronization signal VD.

Operations of the first embodiment are described with reference to FIGS. 2 and 3.

Figure 2:
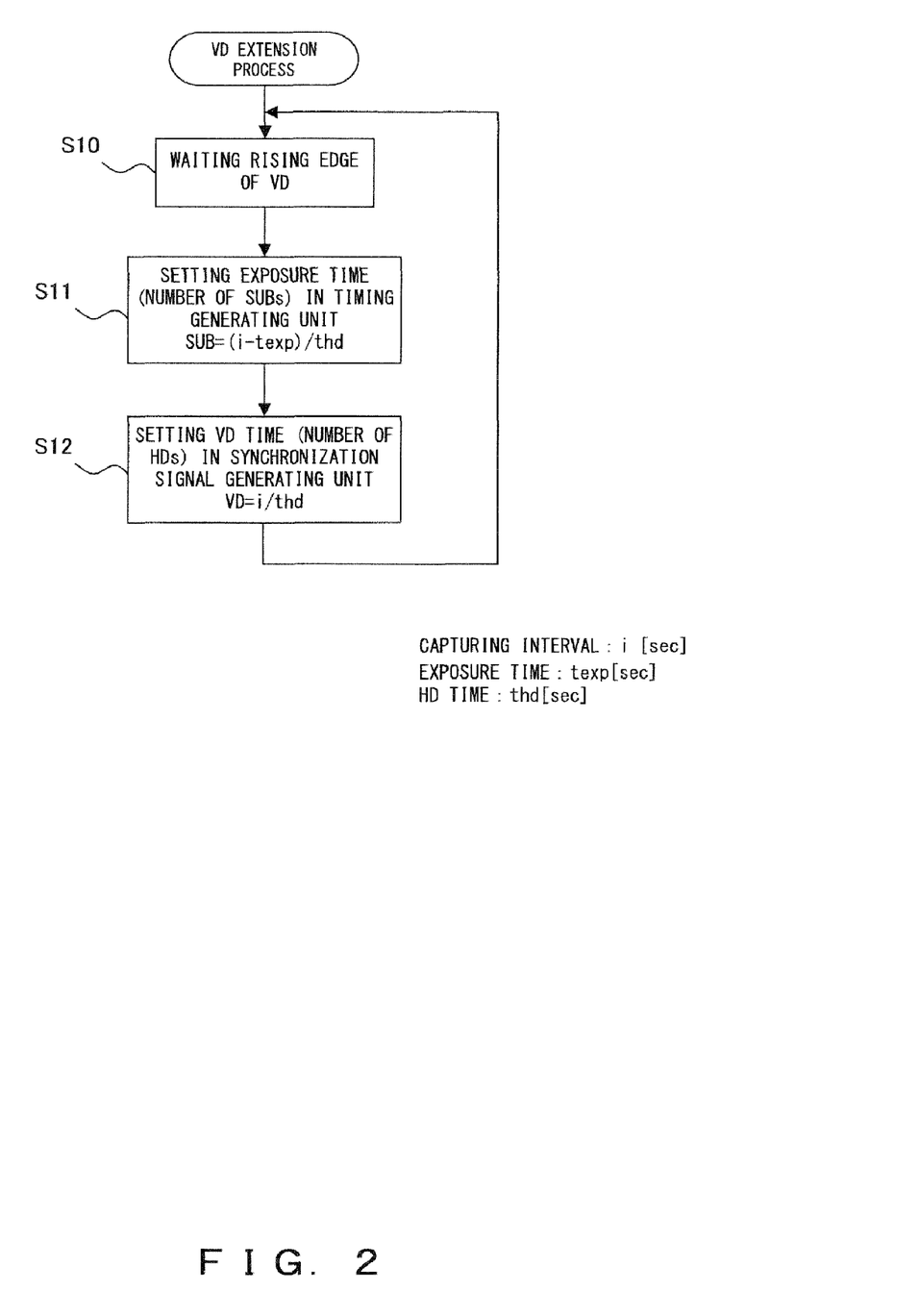
FIG. 2 is a flowchart showing operations of a first embodiment.

FIG. 2 is a flowchart showing a VD extension process executed by the system controlling unit 11 in the first embodiment according to the present invention. The VD extension process shown in FIG. 2 is a process executed in a period (a) of the timing chart shown in FIG. 3.

Figure 3:
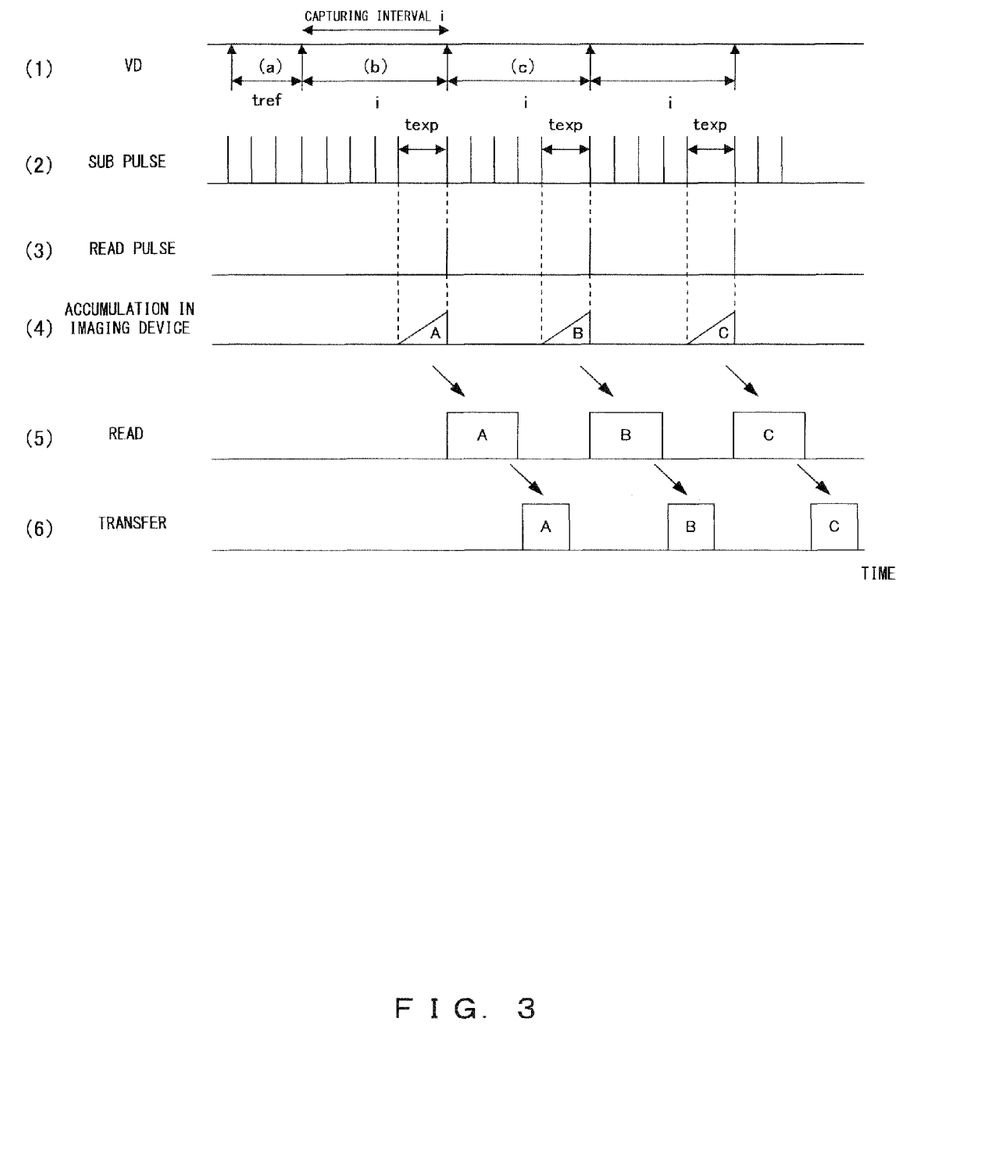
FIG. 3 is a timing chart showing the operations of the first embodiment.

In the timing chart shown in FIG. 3, the vertical and the horizontal axes represent signal waveforms of (1) to (6) and time respectively. (1) represents the waveform of the vertical synchronization signal VD. (2) represents SUB pulses (pulses for extracting the electric charge of the imaging device). (3) represents read pulses for reading an image signal from the imaging device 3. (4) represents the accumulation quantity of pixels in the imaging device 3. (5) represents image signals (data) stored in the memory 7. (6) represents that image data generated by executing the image processes for the image signals (data) are transferred to the computer 13.

Processes executed in the steps shown in FIG. 2 are described below.

In step S10, the rising or the falling edge of the vertical synchronization signal VD is detected as a trigger. In FIGS. 2 and 3, the rising edge of the vertical synchronization signal VD is assumed to be a trigger.

In step S11 (exposure time calculating step), the system controlling unit 11 calculates the number of SUB pulses (the number of electric charge subtracting pulses) in accordance with the following equation (1), and sets the calculated number of SUB pulses in the TG 6 (obtains the number of electric charge subtracting pulses by calculating the number of cycles of the horizontal synchronization signal from a shooting start until exposure start timing in order to set an exposure time within a capturing interval).

$$SUB=(i-texp)/thd \qquad (1)$$

where i (sec) is a capturing interval, texp (sec) is an exposure time, and thd is the cycle of the horizontal synchronization signal HD. The capturing interval i is set with an inputting unit (not shown) provided in the computer 13 required for an operator to start repetitive shooting.

In step S12 (VD time calculating step), the system controlling unit 11 calculates the number of pulses VD (VD time setting value) of the horizontal synchronization signal HD in the cycle of the vertical synchronization signal VD in accordance with the following equation (2), and sets the calculated number in the synchronization signal generating unit 8 (obtains the VD time setting value by calculating the number of cycles of the horizontal synchronization signal within the capturing interval).

$$VD=i/thd \qquad (2)$$

Here, there is a relationship of i>tref between the period of tref (a) shown in FIG. 3 and the capturing interval i.

The standard VD time tref (sec) is a cycle determined in accordance with the number of pixels read from the imaging device 3. Any of cycles that are determined by the all pixel, mode, the 2-binning mode, the 4-binning mode, and a read region of a partial read respectively is selected. Any of tref1=67 (msec) of the all pixel mode, tref2=34 (msec) of the 2-binning mode, tref4=19 (msec) of the 4-pixel mode, and the like is selected as the above described cycle.

Contents set in the period (a) are reflected on processes in and after a period (b).

Next, the vertical synchronization signal is generated on the basis of the VD time setting value and the horizontal synchronization signal, and the electric charge of the imaging device 3 is extracted by supplying the horizontal synchronization signal by the number of electric charge subtracting pulses to the imaging device as the electric charge subtracting pulses. Then, a read pulse synchronous with the vertical synchronization signal is generated to stop the accumulation of the electric charge of the imaging device after exposure is started (timing controlling step).

Operations in the periods of the vertical synchronization signal VD are described below with reference to the timing chart shown in FIG. 3.

In the period (b) of FIG. 3, the synchronization signal generating unit 8 changes a VD cycle to a capturing interval i (sec). The TG 6 outputs SUB pulses for a duration obtained by subtracting an exposure time from the capturing interval i (VD cycle). Accordingly, the imaging device 3 is exposed to light during the period of texp (see). In FIG. 3, image data A represented by the vertical axis (4) is shot in the period (b). In a period (c), image data B is shot. Thereafter, image data C and subsequent data are shot after the period (c).

In the period (c), the imaging device 3 starts to output the image signal upon receipt of the read pulse output from the TG 6. The memory controlling unit 9 reads the image signal that is converted into a digital image signal via the preprocessing unit 4 and the A/D converter 5, and stores the signal in the memory 7. At this time, since there is a relationship that the capturing interval i is longer than the standard VD time tref, it is guaranteed to complete the reading of a desired number of pixels within the cycle of the vertical synchronization signal VD. In FIG. 3, the image data A is read in the period (c) as represented by the vertical axis (5) in FIG. 3. Then, the image data B is read after the period (c), and the image data C and subsequent data are successively read thereafter.

Upon completion of reading the image signals, the program 14 that is running on the computer 13 reads the image signals via the data transferring unit 12. At this time, the image processing unit 10 executes the image processes such as a noise reduction and a tone correction for the digital image signals stored in the memory 7, and transfers the processed signals to the computer 13 via the data transferring unit 12. Moreover, in the period (c), also the process executed in the period (b) is executed in parallel. The image data A is read in the period (c) as represented by the vertical axis (6) in FIG. 3. The image data B is read after the period (c), and the image data C and subsequent data are successively read after the period (c).

As described above, the operations shown in the periods (b) and (c) are also continued after the period (c), whereby a sample image can be obtained with high accuracy at arbitrary capturing intervals without adding hardware or requiring a special hardware process in the microscopic imaging apparatus.

<Second Embodiment>

The first embodiment refers to the configuration where the cycle of the vertical synchronization signal VD is set to the capturing interval i. In contrast, the second embodiment refers to the case where one or more cycles of different times of the vertical synchronization signal VD are inserted in the period of the capturing interval i.

An imaging interval divided value is obtained by calculating the number of cycles of the vertical synchronization signal from an imaging start until an exposure time in the imaging interval. The VD time setting value and the number of electric charge subtracting pulses are set so that the synchronization signal generating unit 8 and the TG 6 supply electric charge subtracting pulses to the imaging device until the number of cycles of the vertical synchronization signal becomes equal to the capturing interval divided value by detecting the number of cycles of the vertical synchronization signal after imaging is started.

The VD time setting value and the number of electric charge subtracting pulses are set so that the synchronization signal generating unit 8 and the TG 6 supply the electric charge subtracting pulses to the imaging device until the exposure start timing after the number of cycles of the vertical synchronization signal becomes equal to the capturing interval divided value by detecting the number of cycles of the vertical synchronization signal after the imaging is started.

Operations of the second embodiment are described below with reference to FIG. 4.

Figure 4:
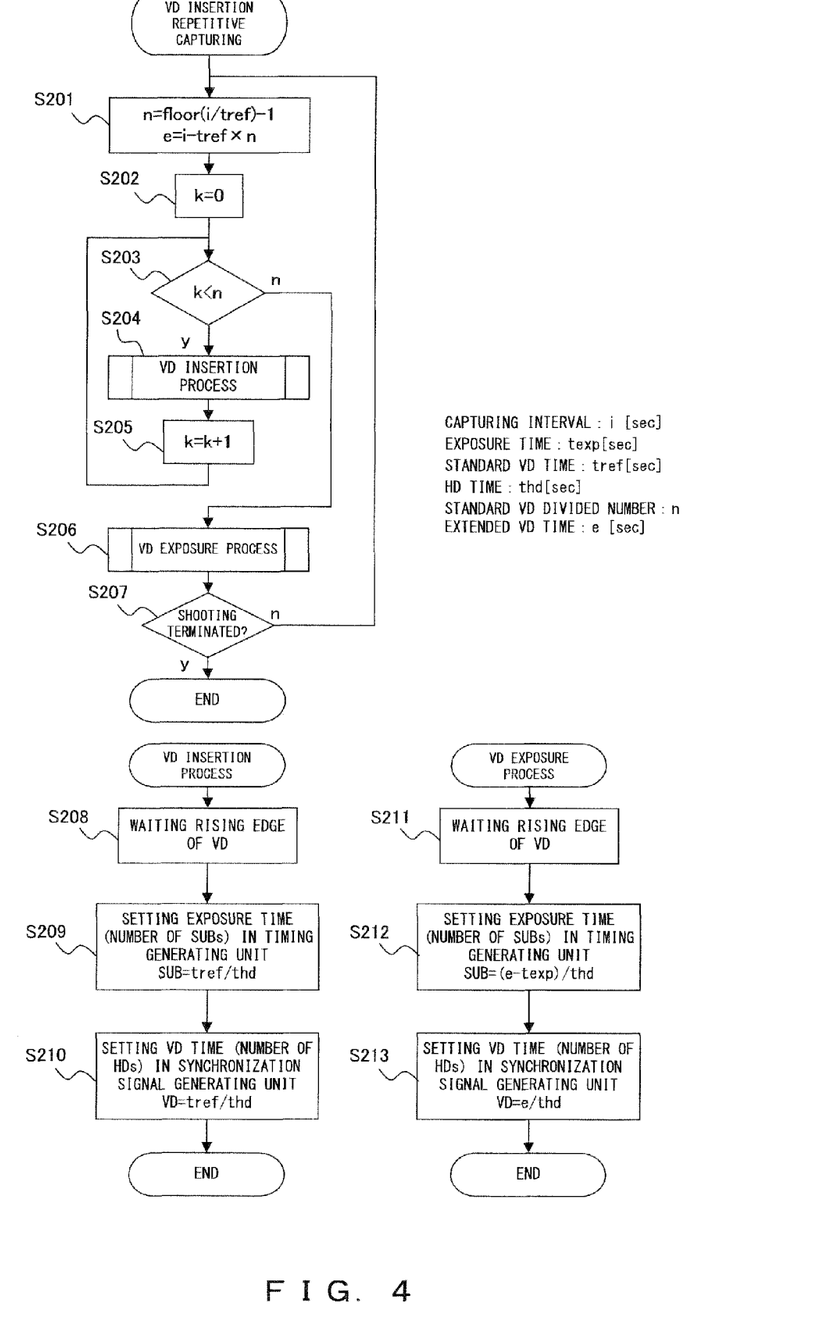
FIG. 4 is a flowchart showing operations of a second embodiment.

FIG. 4 is a flowchart showing the operations of the system controlling unit 11 in the second embodiment. Processes executed in steps are described below.

In step S201, an operator sets the capturing interval i with the computer 13 in accordance with the program 14, and starts repetitive shooting.

The system controlling unit 11 divides the capturing interval i (sec) into n standard VD times tref and one extended VD time of a length e. n (imaging interval divided value) represented by the following equation (3) is an integer equal to or larger than 0, and e has a relationship of $tref \leq e \leq tref \times 2$. floor (X) represented in the equation (4) is a function to obtain the largest integer equal to or smaller than X.

$$n = \text{floor}(i/tref) - 1 \quad (3)$$

$$e = i - tref \times n (\text{sec}) \quad (4)$$

In step S202, the system controlling unit 11 initializes the count value k of a VD counter, which counts the rising or the falling edge of the vertical synchronization signal VD as a trigger, to 0.

In step S203, a comparison is made between a preset determination value n and the count value k of the VD counter. If k is smaller than n, the process goes to step S204. Otherwise, the process goes to step S206.

In step S204, parameters required to set a VD insertion process to be described later are calculated with an arithmetic process.

In step S205, the system controlling unit 11 executes the VD insertion process i-k is smaller than n, and increments the count value k by 1 ($k \leftarrow k+1$). Then, the process goes to step S203.

In step S206, the system controlling unit 11 executes a VD exposure process to be described later if k is equal to or larger than n.

In step S207, whether or not the shooting is terminated is determined. The system controlling unit 11 monitors whether or not the repetitive shooting is terminated by a predetermined number of times, and repeats the processes in steps S201 to S206 until the shooting is terminated by the predetermined number of times.

The VD insertion process and the VD exposure process are described below with reference to FIGS. 4 and 5.

steps S208 to S210 shown in FIG. 4 represent the VD insertion process shown in step S204. The timing chart shown in FIG. 5 is an example in the case of n=2.

Figure 5:
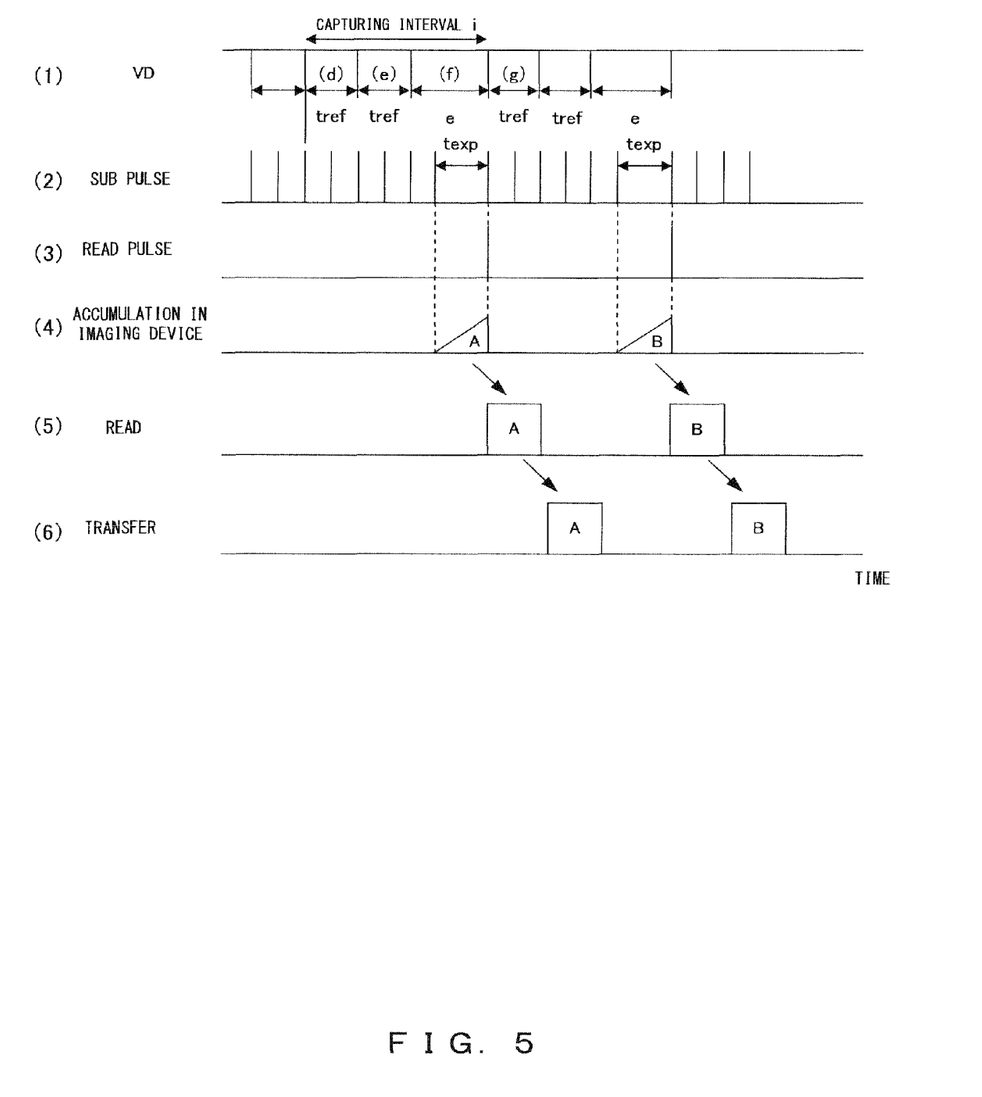
FIG. 5 is a timing chart showing the operations of the second embodiment.

In the timing chart shown in FIG. 5, the vertical and the horizontal axes represent signal waveforms of (1) to (6) and time respectively. (1) represents the waveform of the vertical synchronization signal VD. (2) represents the waveform of a SUB pulse (a pulse for extracting the electric charge of the imaging device). (3) represents read pulses for reading an image signal from the imaging device 3. (4) represents the accumulation quantity of pixels in the imaging device 3. (5) represents image signals (data) stored in the memory 7. (6) represents that image signals (data) generated by executing the image processes for the image signals are transferred to the computer 13.

In step S208 of FIG. 4, the rising edge of the vertical synchronization signal VD is detected as a trigger. The rising or the falling edge of the vertical synchronization signal VD may be detected as a trigger.

In this embodiment, the system controlling unit 11 executes the VD insertion process in synchronization with the rising edge of the vertical synchronization signal VD, which is represented by the vertical axis (1) in the periods (d) and (e) shown in FIG. 5.

In step S209, the system controlling unit 11 calculates the number of SUB pulses (the number of electric charge subtracting pulses) by calculating the number of cycles of the horizontal synchronization signal HD included in the standard VD time tref in accordance with the following equation (5), and sets the calculated number of SUB pulses in the TG 6.

$$SUB = tref/thd \quad (5)$$

In step S210, the system controlling unit 11 calculates VD (VD time setting value), which indicates the number of cycles of the horizontal synchronization signal HD included in the standard VD time tref represented by the vertical axis (1), in accordance with the following equation (6), and sets the synchronization signal generating unit 8.

$$VD = tref/thd \quad (6)$$

where thd (sec) is the time of the horizontal synchronization signal HD, and the standard VD time tref (sec) is a cycle determined in accordance with the number of pixels read from the imaging device. For example, any of tref1=67 (msec) of the all pixel mode, tref2=34 (msec) of the 2-binning mode, tref4=19 (msec) of the 4-binning mode, and a cycle determined by a read region of a partial read is selected.

Operations of the VD exposure process (S206) are described next.

In step S211, the system controlling unit 11 executes the VD exposure process in synchronization with the rising or the falling edge of the vertical synchronization signal VD in the period (f) of VD.

A calculation method executed in the VD exposure process is described below.

In step S212, the system controlling unit 11 calculates the number of SUB pulses (SUB: the number of electric charge subtracting pulses) output in synchronization with the horizontal synchronization signal HD in accordance with the following equation (7), and sets the calculated number of SUB pulses in the TG 6.

$$SUB = (e-texp)/thd \quad (7)$$

In step S213, the system controlling unit 11 calculates VD, which indicates the number of cycles of the horizontal synchronization signal. HD included in an extended VD time, in accordance with the following equation (8), and sets the calculated VD in the synchronization signal generating unit 8.

$$VD = e/thd \quad (8)$$

Here, e (sec) is the extended VD time calculated in step S201, texp (sec) is an exposure time, and thd (sec) is the time of the horizontal synchronization signal HD.

In the periods (d) and (e) of the vertical synchronization signal VD represented by (1) of FIG. 5, the synchronization signal generating unit 8 changes the VD cycle to tref (sec) (standard VD cycle). Since the TG 6 supplies to the imaging device 3 SUB pulses by the number calculated with the equation (7) for each time of the horizontal synchronization signal HD in the periods of the vertical synchronization signal VD as represented by (2) of FIG. 5, the imaging device is not exposed to light.

In the period (f) of the vertical synchronization signal VD represented by (1) of FIG. 5, the synchronization signal generating unit 8 changes the VD cycle to e(sec). The TG 6 outputs SUB pulses for a duration of e-texp (sec) obtained by subtracting an exposure time from the cycle of the vertical synchronization signal VD calculated with the equation (8). Accordingly, the imaging device 3 is exposed to light for the period of texp (sec), and the image data A and B are shot as represented by (4) of FIG. 5.

In a period (g) of the cycle of the vertical synchronization signal VD represented by (1), the imaging device 3 starts to output the image signals upon receipt of the read pulses represented by (3) of FIG. 5. As represented by (5) of FIG. 5, the memory controlling unit 9 reads the image signals (image data A and B), which are converted into digital image signals via the preprocessing unit 4 and the A/D converter 5, and stores the signals in the memory 7. The reading of the image signals is complete in this way. Then, the program 14 that is running on the computer 13 reads the image signals (image data A and B) via the data transferring unit 12 as represented by (6) of FIG. 5. At this time, the image processing unit 10 executes the image processes such as a noise reduction and a tone correction for the digital image signals stored in the memory 7, and transfers the signals to the computer 13 via the data transferring unit 12.

In the imaging apparatus referred to in the first embodiment, a long-duration hardware counter is required for the synchronization signal generating unit, and the imaging device 3 and the TG 6 must cope with the long cycle of the vertical synchronization signal VD. However, with the above described configuration referred to in the first embodiment, a sample image can be obtained with high accuracy at desired capturing intervals without providing a long-duration hardware counter to cope with the long cycle of the vertical synchronization signal VD, or without making the imaging device 3 and the TG 6 cope with the long cycle of VD.

(Third Embodiment)

A configuration of the third embodiment according to the present invention is described below with reference to FIG. 1.

Switching is made between a still image shooting mode for shooting an image by detecting a still image shooting instruction signal issued from a still image shooting instructing unit in synchronization with a capturing interval, and a self-running mode for setting the cycle of the vertical synchronization signal to the capturing interval and for repeating shooting in accordance with the cycle of the vertical synchronization signal.

In the still image shooting mode, the VD time setting value and the number of electric charge subtracting pulses are set so that the synchronization signal generating unit and the timing generating unit supply electric charge subtracting pulses until exposure start timing upon detection of the still image shooting instruction signal.

A cycle of the vertical synchronization signal is set to a cycle determined in accordance with the number of pixels read from the imaging device.

The VD time setting value and the number of electric charge subtracting pulses are set so that the synchronization signal generating unit and the timing generating unit supply the electric charge subtracting pulses from the completion of exposure until the completion timing of shooting in the imaging interval.

The still image shooting instructing unit (generating the still image shooting instruction signal in accordance with the installed program 14 in the PC having the computer 13, etc.) has a software cycle timer for periodically generating an event, and periodically issues the still image shooting instruction to the system controlling unit 11.

The system controlling unit 11 has the still image shooting mode for setting the cycle of the vertical synchronization signal VD generated by the synchronization signal generating unit 8 to a cycle determined in accordance with the number of pixels read from the imaging device 3 and for shooting an image upon detection of the still image shooting instruction as a trigger, and the self-running mode for setting the cycle of the vertical synchronization signal VD generated by the synchronization signal generating unit 8 to the capturing interval i and for repeating shooting in accordance with the cycle of the vertical synchronization signal VD.

Figure 6:
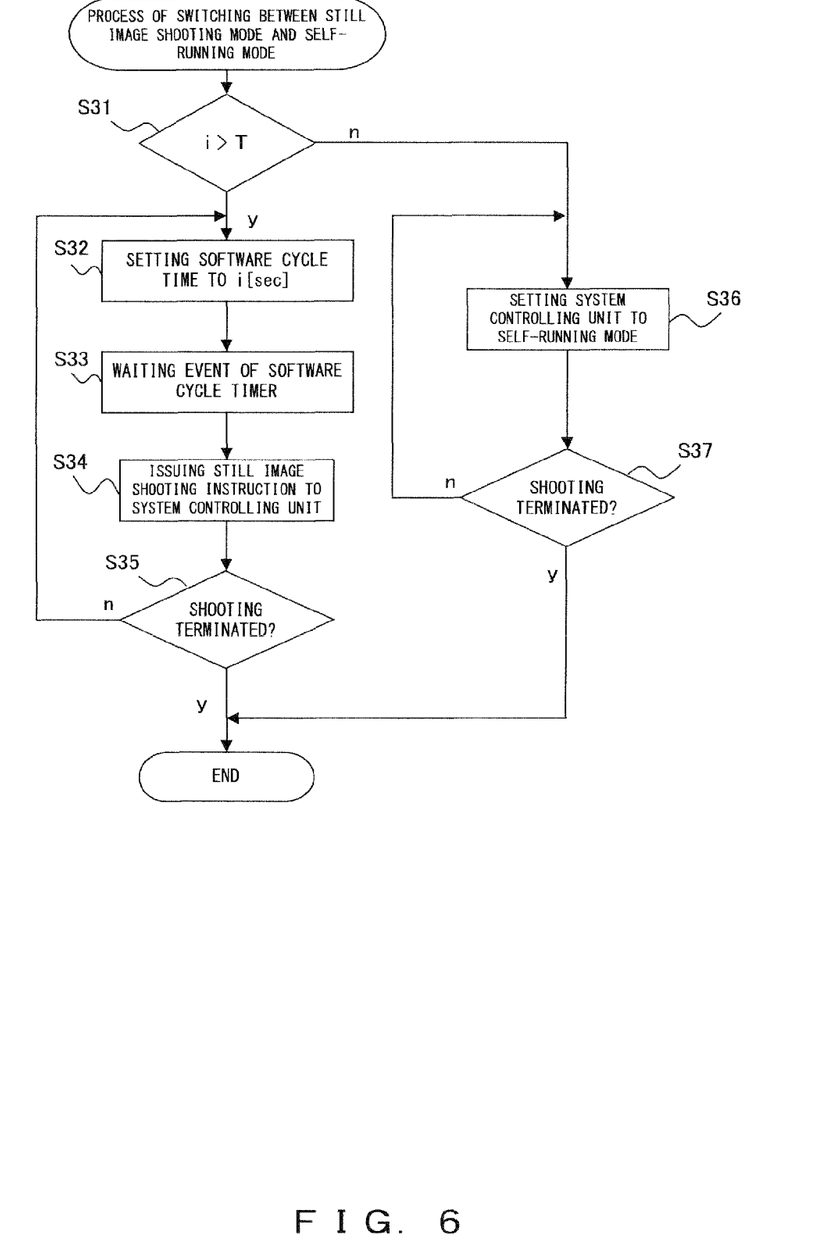
FIG. 6 is a flowchart showing operations of a program in a still image shooting mode.

Operations of the third embodiment according to the present invention are described below with reference to FIG. 6. This figure is a flowchart showing the operations of the program 14 in the still image shooting mode. Operations executed in steps are described below.

An operator makes repetitive shooting by setting the capturing interval i (sec) in the program 14.

In step S31, the operator sets an arbitrary capturing interval i (sec), sets a still image shooting minimum interval to T (sec), and selects the still image shooting mode if i>T is satisfied.

In step S32, the cycle of the software cycle timer for periodically generating an event, which is included in the program 14 that is running on the computer 13, is set to i (sec).

In step S33, the computer 13 (program 14) waits an event of the software cycle timer.

In step S34, the computer 13 (program 14) issues the still image shooting instruction to the system controlling unit 11 when the event occurs. As described above, the system controlling unit 11 repeats the still image shooting upon receipt of the still image shooting instruction.

In step S31, the program 14 selects the self-running mode if i≦T. In step S35, the computer 13 (program 14) repeats the processes in steps S32 to S34 by a preset number of times of shooting, and completes the shooting when the number of times of shooting reaches the preset number of times.

Next, in step S36, the self-running mode is continued until the repetitive shooting is terminated. In the self-running mode, the system controlling unit 11 makes the repetitive shooting by setting the VD cycle to the shooting cycle i (sec) as referred to in the first embodiment.

The computer 13 (program 14) sets the system controlling unit 11 to the self-running mode. For example, any of tref1=67 (msec) of the all pixel mode, tref2=34 (msec) of the 2-binning mode, tref4=19 (msec) of the 4-pixel mode, and the like is selected as the cycle. Then the system controlling unit 11 executes the shooting in the self-running mode.

In step S37, in a similar manner as in step S35, the computer 13 (program 14) repeatedly executes the processes in steps S32 to S34 by the preset number of times of shooting, and terminates the shooting when the number of times of shooting reaches the preset number of times.

Figure 7:
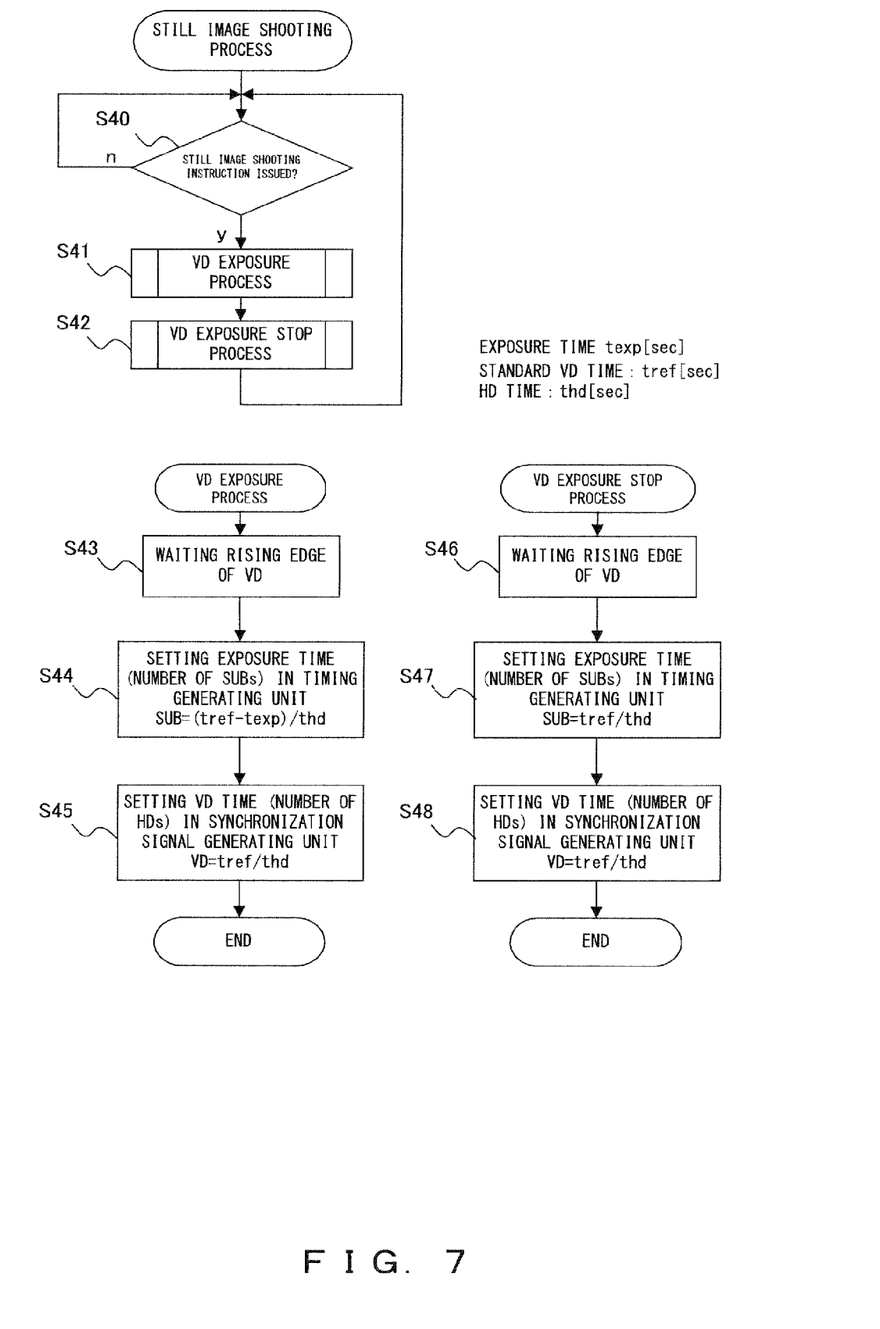
FIG. 7 is a flowchart showing operations of a system controlling unit in the still image shooting mode.

FIG. 7 is a flowchart showing a still image process executed by the system controlling unit 11 in the still image shooting mode. Operations executed in steps are described below.

In step S40, whether or not the still image shooting instruction is issued from the computer 13 via the bus is determined. If the still image shooting instruction is determined not to be issued, step S40 is looped to wait the detection of the still image shooting instruction signal. If the still image shooting instruction is determined to be issued, the process goes to step S41.

In step S41, a VD exposure process to be described later is executed.

In step S42, a VD exposure stop process to be described later is executed.

As described above, the system controlling unit 11 executes the VD exposure process and the VD exposure stop process upon receipt of the still image start shooting instruction issued from the computer 13 (program 14).

A calculation method executed in the VD exposure process (S41) is described below.

Figure 8:
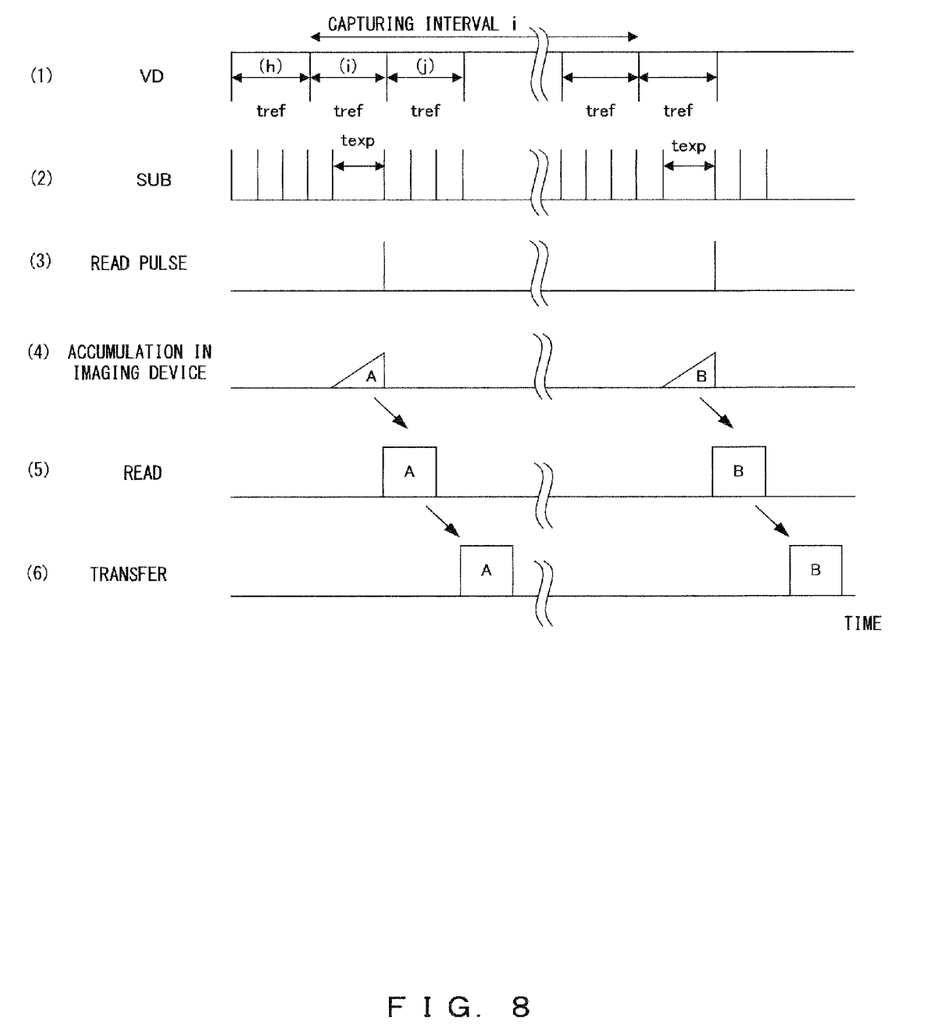
FIG. 8 is a timing chart showing operations of a third embodiment.

In step S43, the system controlling unit 11 executes the VD exposure process in synchronization with the rising edge of the vertical synchronization signal VD in a period (h) shown in the cycle of the vertical synchronization signal VD represented by (1) of FIG. 8.

In step S44, the system controlling unit 11 calculates the number of SUB pulses (the number of electric charge subtracting pulses) in accordance with the following equation (9), and sets the calculated number of SUB pulses in the TG 6.

$$SUB=(tref-texp)/thd \quad (9)$$

In step S45, the system controlling unit 11 calculates VD (VD time setting value), which indicates the number of cycles of the horizontal synchronization signal HD included in the standard VD time, in accordance with the following equation (10), and sets the calculated VD in the synchronization signal generating unit 8.

$$VD=tref/thd \quad (10)$$

Here, tref (sec) is a VD time, texp (sec) is an exposure time, and thd (sec) is the time of the horizontal synchronization signal HD.

A calculation method executed in the VD exposure stop process (step S42) is described next.

In step S46, the system controlling unit 11 executes the VD exposure stop process in synchronization with the rising edge of the vertical synchronization signal VD in a period (i) of the vertical synchronization signal VD represented by (1) of FIG. 8.

In step S47, the system controlling unit 11 calculates the exposure time SUB in accordance with the following equation, and sets the calculated time in the TG 6.

$$SUB=tref/thd \quad (11)$$

In step S48, the system controlling unit 11 calculates the standard VD time VD in accordance with the following equation (12), and sets the calculated time in the synchronization signal generating unit 8.

$$VD=tref/thd \quad (12)$$

where tref (sec) indicates the VD time, texp (see) indicates an exposure time, and thd (sec) indicates the time of the horizontal synchronization signal HD. Moreover, the standard VD time tref (see) is a cycle determined in accordance with the number of pixels read from the imaging device. For example, any of tref1=67 (msec) of the all pixel mode, tref2=34 (msec) of the 2-binning mode, tref4=19 (msec) of the 4-pixel mode, and a cycle determined by a read region of a partial read is selected.

Operations of the third embodiment are described below with reference to the timing chart shown in FIG. 8.

In the timing chart shown in FIG. 8, the vertical and the horizontal axes represent signal waveforms of (1) to (6) and time respectively. (1) represents the waveform of the vertical synchronization signal VD. (2) represents the waveform of a SUB pulse (pulse for extracting the electric charge of the imaging device). (3) represents read pulses for reading an image signal from the imaging device 3. (4) represents the accumulation quantity of pixels in the imaging device 3. (5) represents image signals (data) stored in the memory 7. (6) represents that image signals (data) generated by executing the image processes for the image signals are transferred to the computer 13.

In a period (h) shown in the cycle of the vertical synchronization signal VD represented by (1) of FIG. 8, the system controlling unit 11 executes the VD exposure process in synchronization with the rising edge of the vertical synchronization signal VD as described above.

In a period (i) in the cycle of the vertical synchronization signal VD shown in FIG. 8, the cycle of the vertical synchronization signal VD generated by the synchronization signal generating unit 8 is a standard VD time. The TG 6 outputs SUB pulses for a duration obtained by extracting an exposure time from the cycle of the vertical synchronization signal VD. Accordingly, the imaging device 3 is exposed to light for the period of texp (sec).

In a period (j) in the cycle of the vertical synchronization signal VD shown in FIG. 8, the imaging device 3 starts to output image signals upon receipt of the read pulses represented by (3). The memory controlling unit 9 reads the image signals, which are converted into digital image signals via the preprocessing unit 4 and the A/D converter 5, and stores the read signals in the memory 7 as represented by (4). Upon completion of reading the image signals, the program 14 that is running on the computer 13 reads the image signals via the data transferring unit 12 as represented by (5). At this time, the image processing unit 10 executes the image processes such as a noise reduction and a tone correction for the digital image signals stored in the memory 7, and transfers the image signals to the computer 13 via the data transferring unit 12.

The cycle of the vertical synchronization signal VD generated by the synchronization signal generating unit 8 is a standard VD time. Since the TG 6 continues to generate a SUB pulse for the cycle of the vertical synchronization signal VD, the imaging device 3 is not exposed to light.

As described above, the still image shooting mode is selected if the capturing interval i is longer than the still image shooting minimum interval T, whereby a sample image can be obtained at desired capturing intervals without providing a long-duration hardware counter to cope with a long cycle of the vertical synchronization signal VD, and without making the imaging device 3 and the TG6 cope with the long cycle of the vertical synchronization signal VD. By setting the still image shooting minimum interval T to a sufficiently long interval with respect to the transmission of the still image shooting instruction or the cycle of the vertical synchronization signal VD, a sample image can be obtained with some degree of accuracy for the capturing interval i. Moreover, the self-running mode is selected if the capturing interval i is equal to or shorter than the still image shooting minimum interval T, whereby a sample image can be obtained with high accuracy at desired capturing intervals.

According to the present invention, time lapse capturing can be made with high accuracy at arbitrary capturing intervals without adding hardware or requiring a special hardware process.

Furthermore, the present invention is not limited to the above described embodiments, and can be modified and changed in a variety of ways within a scope that does not depart from the gist of the present invention.

What is claimed is:

1. A microscopic imaging apparatus that can make time lapse capturing for repeatedly obtaining a digital image at desired capturing intervals, the apparatus comprising:
   a system controlling unit for obtaining (i) a VD time setting value which is a value obtained by calculating a number of cycles of a horizontal synchronization signal within a capturing interval, and (ii) a number of electric charge subtracting pulses by calculating a number of cycles of the horizontal synchronization signal in a duration from a shooting start until an exposure start timing in order to set an exposure time within the capturing interval;
   a synchronization signal generating unit for generating a vertical synchronization signal based on the VD time setting value output from the system controlling unit and the horizontal synchronization signal; and
   a timing generating unit for extracting an electric charge of an imaging device by supplying the horizontal synchronization signal by the number of electric charge subtracting pulses to the imaging device as the electric charge subtracting pulses, and for generating a read pulse synchronous with the vertical synchronization signal in order to stop accumulation of the electric charge of the imaging device after exposure is started.

2. The microscopic imaging apparatus according to claim 1, wherein the system controlling unit obtains an imaging interval divided value by calculating a number of cycles of the vertical synchronization signal from the imaging start until an exposure time in the imaging interval, sets the VD time setting value and the number of electric charge subtracting pulses so that the synchronization signal generating unit and the timing generating unit supply the electric charge subtracting pulses to the imaging device until the number of cycles of the vertical synchronization signal becomes equal to the imaging interval divided value by detecting the number of cycles of the vertical synchronization signal after imaging is started, and sets the VD time setting value and the number of electric charge subtracting pulses so that the synchronization signal generating unit and the timing generating unit supply the electric charge subtracting pulses to the imaging device until the exposure start timing after the number of cycles of the vertical synchronization signal becomes equal to the capturing interval divided value by detecting the number of cycles of the vertical synchronization signal after the imaging is started.

3. The microscopic imaging apparatus according to claim 1, wherein:
   the system controlling unit has (i) a still image shooting mode in which a cycle of the vertical synchronization signal is set to a cycle determined in accordance with a number of pixels read from the imaging device and in which an image is shot upon detection of a still image shooting instruction signal issued from a still image shooting instructing unit in synchronization with the capturing interval, and (ii) a self-running mode in which the cycle of the vertical synchronization signal is set to the capturing interval and in which shooting is repeated in accordance with the cycle of the vertical synchronization signal; and
   the system controlling unit switches between the still image shooting mode and the self-running mode in accordance with the capturing interval.

4. The microscopic imaging apparatus according to claim 3, wherein in the still image shooting mode, the VD time setting value and the number of electric charge subtracting pulses are set so that the synchronization signal generating unit and the timing generating unit supply the electric charge subtracting pulses to the imaging device until the exposure start timing upon detection of the still image shooting instruction signal, and the VD time setting value and the number of electric charge subtracting pulses are set so that the synchronization signal generating unit and the timing generating unit supply the electric charge subtracting pulses to the imaging device from exposure completion until shooting completion timing in the capturing interval.

5. A microscopic imaging method that can make time lapse capturing for repeatedly obtaining a digital image at desired capturing intervals, the method comprising:
   a VD time calculating step of obtaining a VD time setting value, the VD time setting value being obtained by calculating a number of cycles of a horizontal synchronization signal within a capturing interval;

an exposure time calculating step of obtaining a number of electric charge subtracting pulses by calculating a number of cycles of the horizontal synchronization signal in a duration from a shooting start until an exposure start timing in order to set an exposure time within the capturing interval; and a timing controlling step of (i) generating a vertical synchronization signal based on the VD time setting value and the horizontal synchronization signal, (ii) extracting an electric charge of an imaging device by supplying the horizontal synchronization signal by the number of electric charge subtracting pulses to the imaging device as the electric charge subtracting pulses, and (iii) generating a read pulse synchronous with the vertical synchronization signal in order to stop accumulation of the electric charge of the imaging device after exposure is started.

6. The microscopic imaging method according to claim 5, wherein the timing controlling step comprises:

obtaining an imaging interval divided value by calculating a number of cycles of the vertical synchronization signal from the shooting start until the exposure time in the capturing interval, setting the VD time setting value and the number of electric charge subtracting pulses so that the electric charge subtracting pulses are supplied to the imaging device until the number of cycles of the vertical synchronization signal becomes equal to the imaging interval divided value by detecting the number of cycles of the vertical synchronization signal after imaging is started, and setting the VD time setting value and the number of electric charge subtracting pulses so that the electric charge subtracting pulses are supplied to the imaging device until the exposure start timing after the number of cycles of the vertical synchronization signal becomes equal to the capturing interval divided value by detecting the number of cycles of the vertical synchronization signal after the imaging is started.

7. The microscopic imaging method according to claim 5, wherein:

the timing controlling step is performed in one of (i) a still image shooting mode in which a cycle of the vertical synchronization signal is set to a cycle determined in accordance with a number of pixels read from the imaging device and in which an image is shot upon detection of a still image shooting instruction signal issued from a still image shooting instructing unit in synchronization with the capturing interval, and (ii) a self-running mode in which the cycle of the vertical synchronization signal is set to the capturing interval and in which shooting is repeated in accordance with the cycle of the vertical synchronization signal; and switching is made between the still image shooting mode and the self-running mode in accordance with the capturing interval.

8. The microscopic imaging method according to claim 7, wherein in the still image shooting mode, the VD time setting value and the number of electric charge subtracting pulses are set so that the electric charge subtracting pulses are supplied to the imaging device until the exposure start timing upon detection of the still image shooting instruction signal, and the VD time setting value and the number of electric charge subtracting pulses are set so that the electric charge subtracting pulses are supplied to the imaging device from exposure completion until shooting completion timing in the capturing interval.

* * * * *